Figure 1:
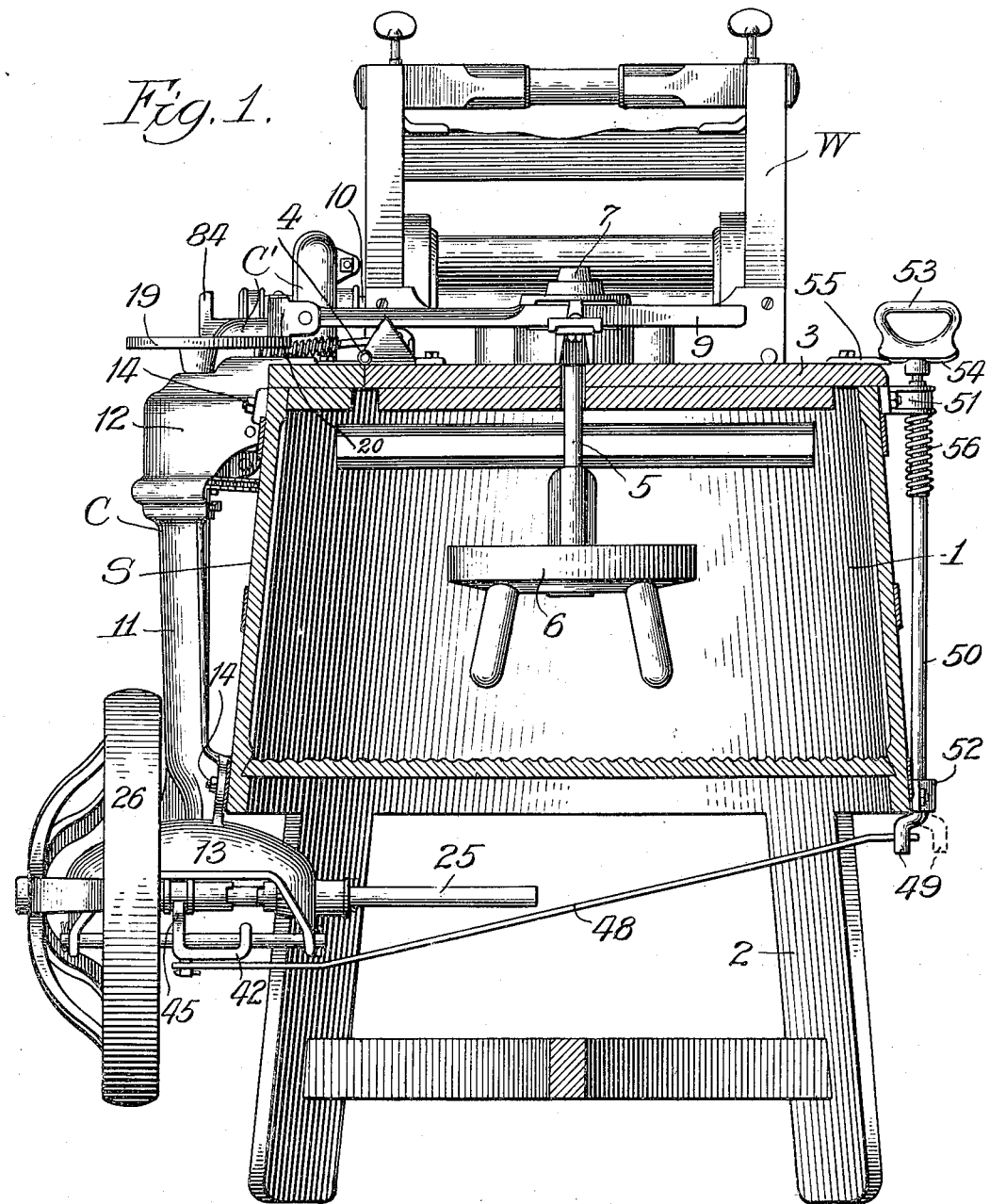

H. F. SNYDER.
GEAR MECHANISM.
APPLICATION FILED APR. 10, 1911.

1,046,034.

Patented Dec. 3, 1912.

4 SHEETS—SHEET 1.

Witnesses:
John Enders
A. A. Thomas

Inventor
Howard F. Snyder,
by Wallace R. Lane
Atty.

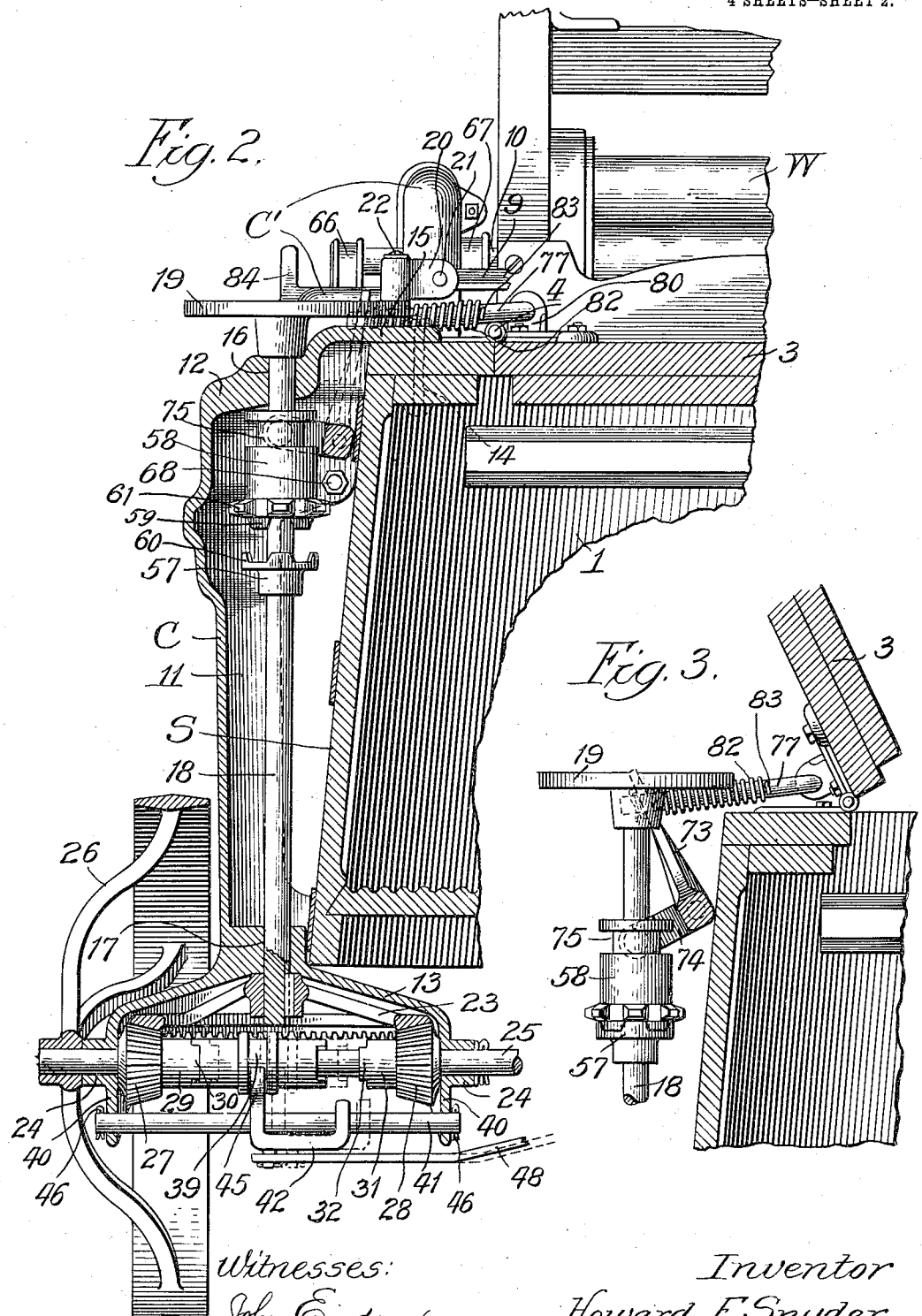

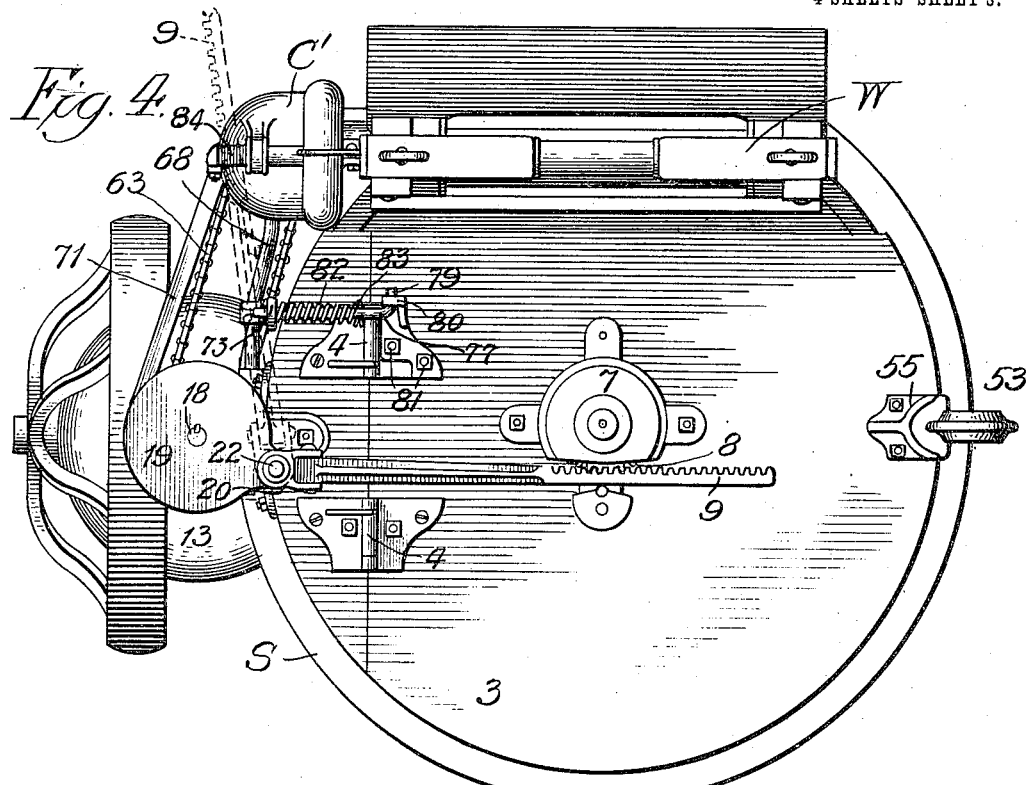
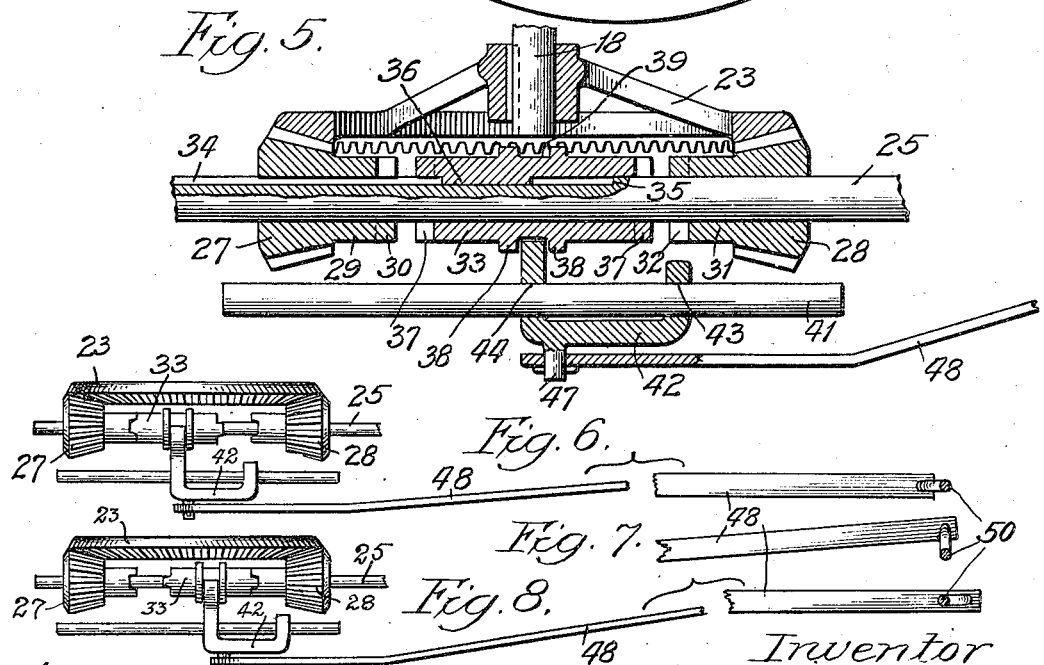

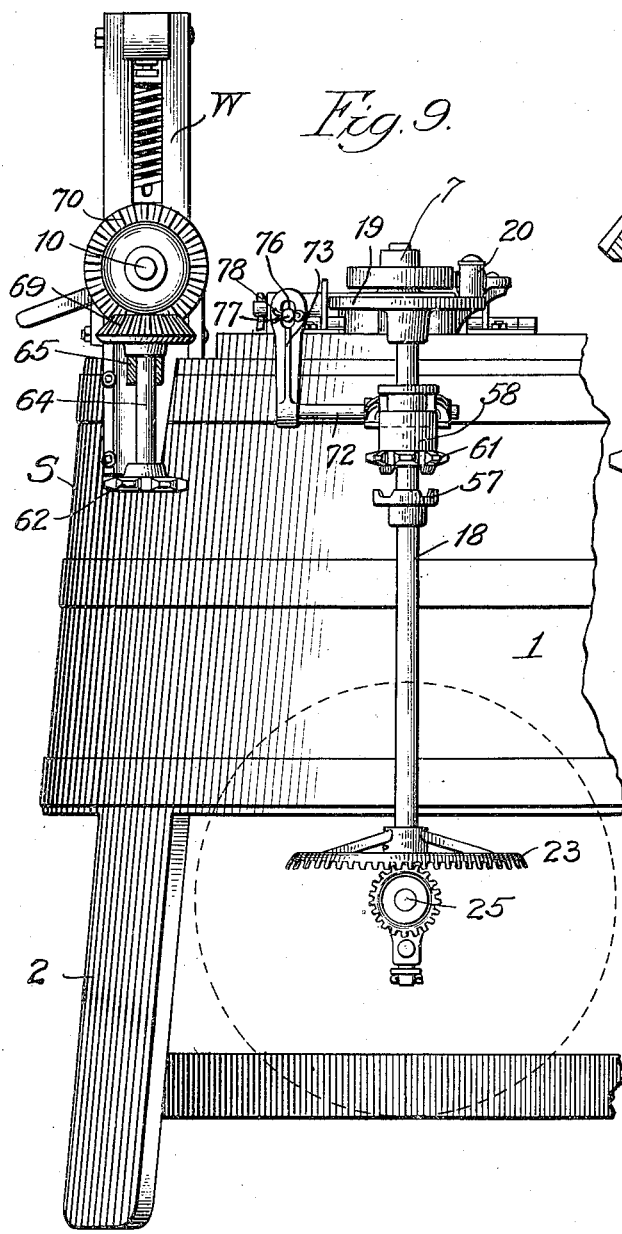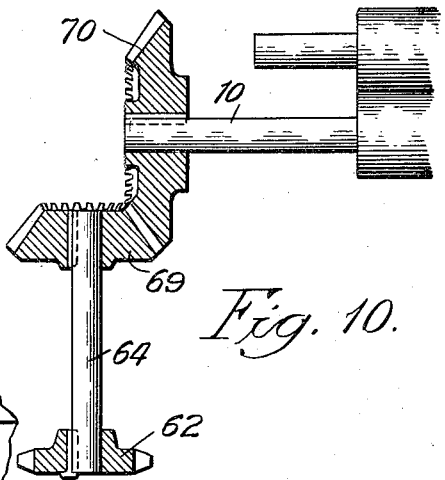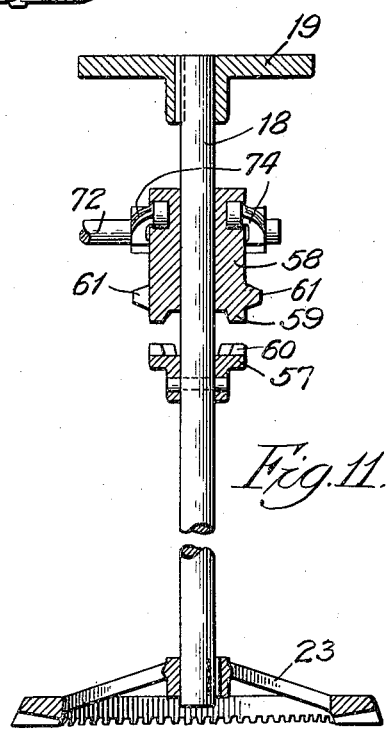

UNITED STATES PATENT OFFICE.

HOWARD F. SNYDER, OF NEWTON, IOWA, ASSIGNOR TO THE MAYTAG COMPANY, OF NEWTON, IOWA, A CORPORATION OF IOWA.

GEAR MECHANISM.

1,046,034.           Specification of Letters Patent.      Patented Dec. 3, 1912.

Application filed April 10, 1911. Serial No. 620,101.

*To all whom it may concern:*

Be it known that I, HOWARD F. SNYDER, a citizen of the United States, residing at Newton, in the county of Jasper and State of Iowa, have invented a new and Improved Gear Mechanism, of which the following is a specification.

My invention relates to gear mechanism which is particularly applicable to motor-driven washing machines or like devices.

For the sake of illustration I have shown my new and improved gear mechanism as applied to a washing machine, although I would have it understood that my invention is by no means limited to such use.

One object of my invention is to provide a readily reversible driving connection between the power shaft and the associated transmission shaft which imparts its movement to two members—one of these members may be the wringer shaft and the other the alternately rotatable upright shaft extending into the tub of the washing machine.

Another object of my invention is to provide means whereby the wringer or other shaft cannot be clutched into driving relation with the transmission shaft when the hinged member or top of the washing machine is closed.

Another object of my invention is to provide a clutch between the transmission shaft and the wringer shaft, so arranged that when the hinged member or cover of the washing machine is in closed position, the clutch is open and when the hinged member is rocked upwardly into open position the clutch is automatically shifted to closed position.

The above and other objects and advantages of my invention will become apparent from the detailed description of the accompanying drawings in which—

Figure 1 is a side elevation of a power washer to which my improved gear mechanism is applied, the support or frame-work on which the gear mechanism is mounted being shown partially in cross-section; Fig. 2 is a cross-sectional view of my improved gear mechanism, certain parts being, for the sake of clearness, shown in elevation; Fig. 3 is a detailed view showing the hinged member of the support for the gearing in open position with the associated clutch in closed position; Fig. 4 is a plan view of the machine shown in Fig. 1; Fig. 5 is a cross-sectional detail view showing the reversible clutch connection between the power shaft and the transmission shaft; Figs. 6, 7 and 8 are detached detailed views showing the clutch operating crank in three different positions and the connected clutch in both of its operative positions; Fig. 9 is a view at right angles to Fig. 1, looking from left to right, the inclosing casings for the different parts of the gear mechanism being removed; Fig. 10 is a cross-sectional detail view showing the driving connection between the counter-shaft and the wringer shaft; and Fig. 11 is a longitudinal cross-sectional view of the vertical transmission shaft showing the clutch which is slidably mounted on this shaft for connecting the same to the counter-shaft.

The different parts of my improved gear mechanism are held in operative relation to each other by a suitable frame-work or support indicated, as a whole, by S. As I have, for the sake of illustration, shown my invention applied to a washing machine, the support or frame-work S is the tub of the washing machine, and comprises a body portion 1, legs 2 and a top or cover 3 which is connected to the body portion 1 by means of hinges 4. The hinged member 3 supports the upright shaft 5 which extends into the tub and is at its lower end provided with a dolly head 6. The upper end of the shaft 5 is suitably supported in the casting 7 attached to the hinged member 3. The pinion 8 is fixed to the shaft 5 near the upper end thereof and is housed in the casting 7. The pinion 8 forms the operative connection between the shaft 5 and toothed rack bar 9 which is adapted to be reciprocated by connections to be presently described. At one side of the support S is rigidly secured the wringer indicated, as a whole, by W. The wringer shaft 10 extends from one of the wringer rolls and is adapted to be rigidly connected with the power shaft of my improved gear mechanism, as will presently appear. Of course, the driven shaft 10 may operate various devices besides wringers, depending upon the particular use to which my improved gear mechanism is put. Also, the upright shaft, which is given an oscillatory movement through the rack bar 9, may perform various functions, in accordance with whatever device may be associated with it.

At the side of the support or frame-work S is secured a casting indicated, as a whole, by C and comprising a central body portion 11, an upper head portion 12 and a lower enlargement 13 substantially bell-shaped in form. Bolts 14, or other suitable fastening devices, hold the casting C firmly in place on the support. The head portion of the casting C is provided with an extension 15 resting on top of the support. One or more of the bolts 14 may pass through this extension as additional securing means.

As seen from Figs. 1 and 2, the bell 13 projects partly under the body portion of the support S. The casting C is provided with an upper bearing 16 and a lower bearing 17 for rotatably supporting the vertical transmission shaft 18. To the upper end of the shaft 18 is fixed a crank disk 19 or other eccentric member to which the rack bar 9 is connected by means of a swivel joint 20. The rack bar is directly connected to the swivel joint by the horizontal pin 21, while the swivel joint itself is connected to the crank disk by the vertical crank pin 22. It is obvious that continuous rotation of the shaft 18 results in a reciprocating movement of the rack bar 9. A horizontal gear wheel 23 is fixed upon the lower end of the transmission shaft 18.

As best shown in Fig. 2, the gear wheel 23 is housed within the bell 13 and is thus completely protected. The bell is provided with a pair of bearing portions 24 in which is journaled the horizontal power shaft 25, to the outer end of which is fixed the driving pulley 26. On the power shaft 25 are rotatably mounted the pinions 27 and 28 arranged to engage the gear wheel 23 at diametrically opposite points thereof for actuating the gear wheel in one direction or the other. The bevel pinions 27 and 28 rest at their outer ends against the bell 13 and are prevented from moving toward each other by virtue of their engagement with the beveled teeth at the bottom of the gear wheel 23. The pinion 27 is provided with a hub 29 having clutch teeth 30. Similarly the pinion 28 is provided with a hub 31 having clutch teeth 32. The clutch sleeve 33 is slidably and non-rotatably mounted on the shaft 25 between the pinions 27 and 28. Any suitable means may be employed for permitting the clutch sleeve 33 to slide freely on the shaft 25 and yet compelling it to rotate therewith. In the particular embodiment illustrated in the drawings, I have shown the shaft 25 provided with a key-way 34 which extends from one end to the point 35. The clutch sleeve 33 is provided with an integral spline or feather 36 which operates in the key-way 34 and permits the clutch sleeve to slide freely on the shaft but compels it to rotate with the shaft at all times. The clutch member or sleeve 33 is at its opposite ends provided with clutch teeth 37 which are adapted to interlock with the clutch teeth of the pinions 27 and 28 to cause rotation of one or the other of said pinions. The clutch sleeve 33 is provided with shoulders 38 which form a groove 39. The bell 13 is provided with a pair of depending bearing portions 40 below the bearing portions 24 for receiving the shaft 41 on which is slidably mounted the bracket 42. This bracket is provided with openings 43 and 44 through which the shaft 41 extends. The bracket is at one end provided with a pair of arms 45 which extend into the groove 39. By sliding the bracket 42, the clutch sleeve 33 is shifted correspondingly. The connection between these two members does not interfere with the rotation of the clutch sleeve 33, while permitting the shifting of the clutch sleeve at any time. The shaft 41 is held in its bearings by any suitable means such as the cotter pins 46. The bracket 42 is provided with a depending lug or pin 47 to which is connected one end of the link or rod 48. The other end of the link or rod is connected to the crank portion 49 at the lower end of the vertical crank shaft 50 which is arranged at the side of the support S opposite the casting C. The vertical crank shaft is held in place on the support by means of bearing brackets 51 and 52. The handle 53 is provided at the upper end of the crank shaft 50 for operating the same.

In the particular embodiment illustrated, the handle 53 is provided with an under surface 54 which acts as a latch for the hinged member 3. A bearing plate 55 is rigidly attached to the hinged member 3 and so arranged as to receive the latch surface 54 of the handle when the latter is in locking position, as shown in Figs. 1 and 4. It is obvious that the latch for the hinged member need not be an integral part of the handle but may be separate therefrom. The bearing plate 55 is preferably provided with a groove into which the ridged latching surface 54 snaps as the handle 53 is turned. A spring 56 coiled about the crank shaft 55 bears at one end against the bracket 51 and at its lower end against a suitable stop on the crank shaft to hold the latching surface 54 in the groove of the bearing plate 55. When the crank shaft 50 is in the position shown in Figs. 1 and 6, the clutch member 33 has clutched in the pinion 27 and rotation of the power shaft 25 in a given direction causes rotation of the gear wheel 23 and the transmission shaft 18 in a corresponding direction. It will be noticed that when the clutch member 33 is in this one of its two operative positions, the handle 53 is in latching position. In order to move the clutch sleeve 33 into operative position, it is necessary that the handle 53 be turned to unlatched position. The corresponding position of the crank shaft 50 may be called its neutral position, as shown in Fig. 7. The advantage of compelling the movement of the clutch member 33 to inoperative position when the hinged member 3 is unlatched, is obvious. In washing machines it is necessary to throw open the cover before using the wringer mechanism. According to my invention the cover can not be thrown open without first disconnecting the transmission shaft 18 from the power shaft 25. This precludes the possibility of any accident either to the operator or to parts of the mechanism when the cover of the washing machine is raised. When it is desired to reverse the driving connection between the power shaft 25 and transmission shaft 18, the crank shaft 50 is rocked into the position indicated in Fig. 8 to bring the clutch member 33 into locking engagement with the pinion 28. As will presently be explained, this reversal of rotation of the transmission shaft 18 reverses the direction of rotation of the shaft 10 which actuates the wringer mechanism.

A clutch member 57 is fixed upon the transmission shaft 18, as best shown in Fig. 11. With the fixed clutch member 57 coöperates the clutch sleeve 58 which is rotatably and slidably mounted on the shaft 18. The lower end of the clutch sleeve 58 is provided with teeth 59 which interlock with the teeth 60 on the fixed clutch member 57 to lock the two clutch members rigidly together. The clutch sleeve 58 is provided with sprocket teeth 61 which coöperate with the sprocket wheel 62 to support the driving chain or other flexible connection 63. The sprocket wheel 62 is fixed upon the lower end of the vertical counter-shaft 64 journaled in the casting indicated, as a whole, by C'. The upper bearing for the counter-shaft 64 in the casting C' is shown at 65 in Fig. 9, the lower bearing, for the sake of clearness, being omitted. The casting C' is held in place on the support in any suitable manner. In the present instance the casting C' is supported on the shaft 10 by means of the bearing portions 66 and 67 from which the casting C' may be said to be suspended. A rod 68 is at one end connected to the head 12 of the casting C and at the other end to the lower portion of the casting C' for steadying the latter. To the upper end of the counter-shaft 64 is fixed the bevel gear 69 arranged to mesh with the bevel gear 70 fixed upon the outer end of the shaft 10. The casting C' is such a configuration as to wholly inclose the bevel gears 69 and 70. If desired a guard 71 may be provided for inclosing the outer run of the sprocket chain 63 so as to prevent the operator from coming into contact with the chain. In the illustration of the drawings, the guard 71 is at one end secured to the casting C and at the other end to the side of the support, and also serves to partially inclose the sprocket wheel 62. By means of the above described connections it is obvious that the rotation of the transmission shaft 18 is transmitted to the shaft 10 when the clutch members 57 and 58 are locked together.

I will now describe the means which I have provided for operating the movable clutch member 58. A crank shaft 72 is journaled in the head 12 of the casting C. One end of the shaft extends from the casting C and has fixed thereto an arm 73. A yoke having arms 74 is fixed upon the shaft 72 within the casting C and so arranged that the free ends of the arms 74 engage the groove 75 on the clutch sleeve 58. The arm 73 is at its upper end provided with an opening 76 through which extends the rod 77. A cotter pin 78 or other retaining device prevents separation of the arm 73 and rod 77. The inner end of the rod 77 is bent laterally as indicated at 79 in Fig. 4 and passes through an opening in the bracket 80 fixed upon the hinged member 3 by screws or bolts 81. A compression spring 82 is coiled about the rod 77. One end of this spring bears against a suitable stop 83 on the rod 77 and at the other end against the arm 73. When the cover or hinged member 3 is in closed position, the rod 77 holds the arm 73 in the position indicated in Fig. 2 and the clutch member 58 is in open or inoperative position. Nor can the shaft 72 be rocked as long as the cover 3 remains closed. However, when the cover is thrown open into the position shown in Fig. 3, the pressure of the spring 82 against the upper end of the arm 73 rocks the latter downwardly until the clutch sleeve 58 is in firm locking engagement with the fixed clutch member 57. It will thus be seen that when the hinged member 3 is thrown open the driving connection between the transmission shaft 18 and the wringer shaft 10 is automatically established. As long as the cover remains closed the wringer cannot be operated from the power shaft. This positively prevents any accidental clutching-in of the wringer shaft at the time when the wringer is not needed.

The operation of my improved gear mechanism will be understood from the above description but may here be recapitulated as follows: When power is applied to the pulley 26 through a gas engine, electric motor, or other power machine, and the parts are in the position shown in Fig. 1, the transmission shaft 18 is rotated in a forward direction through the pinion 27 and the gear wheel 23. This rotates the crank disk 19 and causes reciprocation of the connecting rack 9 which imparts an alternating rotary motion to the shaft 5. The shaft 10 is uncoupled from the transmission shaft 18 because the clutch member 58 is in open or inoperative position, due to the fact that the hinged cover 3 is closed. To open the cover, the rack bar 9 is lifted out of engagement with the pinion 8 and laid upon the bracket 84 formed on the casting C'. A swivel connection 20 between the crank disk 19 and the rack bar 9 permits the latter to be readily moved from the position shown in full lines to that shown in dotted lines in Fig. 4. The latch handle 53 is then given a quarter of a turn so as to unlatch the cover 3. During this movement of the handle the crank shaft 50 is rocked into the position indicated in Fig. 7 to shift the clutch member 33 from the position shown in Fig. 6 to its inoperative or midway position shown in Fig. 5. The cover 3 may now be raised into open position. When this is done the slidable clutch member 58 is automatically forced downwardly into locking engagement with the clutch member 57 fixed on the transmission shaft 18, thereby coupling the wringer shaft 10 with the transmission shaft 18. To throw the wringer mechanism into operation, the handle 53 is moved into one or the other of the positions indicated in Figs. 6 and 8. Assuming that the position of the clutch member 33 as shown in Fig. 6 causes rotation of the wringer shaft 10 in the normal or forward direction, to reverse the rotation of the wringer the crank shaft 50 is moved from the position shown in Fig. 6 to that shown in Fig. 8 by giving the handle 53 half a turn. During the operation of the wringer mechanism the rack bar 9 is moved back and forward in its idle or inoperative position on the supporting bracket 84. As the operator stands at the other side of the support or tub, the idly reciprocating rack bar is not in the way.

While I have described and illustrated one specific embodiment of my invention, it is to be understood that I do not desire to be limited to the precise form shown, since various changes and modifications may be made by those skilled in the art without departing from the scope of the invention as defined in the appended claims.

Having thus described my invention what I claim as new and desire to secure by Letters Patent of the United States is:

1. In a gear mechanism of the class described, the combination of a suitable support, a vertical transmission shaft rotatably mounted at the side of said support, a horizontal gear wheel fixed to the lower end of said shaft, a horizontal crank member fixed to the upper end of said shaft, a rack bar connected to said crank member for reciprocatory movement when said shaft is rotated, a central upright shaft, a pinion thereon with which said rack bar is adapted to mesh, a horizontal power shaft, means for operatively connecting said power shaft to said gear wheel, and driving means secured on said power shaft.

2. In a gear mechanism of the class described, the combination of a suitable support, a vertical transmission shaft rotatably mounted at the side of said support, a horizontal crank member fixed to the upper end of said shaft, a rack bar connected to said crank member for reciprocatory movement when said shaft is rotated, a central upright shaft, a pinion thereon with which said rack bar is adapted to mesh, a driving pulley carried by said support, and means for operatively connecting said transmission shaft with said pulley.

3. In a gear mechanism of the class described, the combination of a suitable support, a vertical transmission shaft rotatably mounted at the side of said support, a horizontal gear wheel fixed to the lower end of said shaft, a central upright shaft carried on said support, driving connections between said shafts, a power shaft, a pinion rotatably arranged on said power shaft to engage said gear wheel, and a clutch device for operatively connecting said pinion with said power shaft.

4. In a gear mechanism of the class described, the combination of a suitable support provided with a hinged member, a latch for said hinged member, a driving shaft and a driven shaft rotatably mounted on said support, a gear connection between said shafts, a clutch for controlling said gear connection, and operative connections between said latch and said clutch whereby the clutch is closed when the latch is in closed position and is automatically opened when the latch is moved into open position.

5. In a gear mechanism of the class described, the combination of a suitable support provided with a hinged member, a latch for said hinged member, a vertical crank shaft mounted at the side of said support and connected at its upper end with said latch, a vertical transmission shaft mounted at the side of said support opposite to said crank shaft, a horizontal power shaft carried by said support, a gear connection between said power shaft and said transmission shaft, a clutch for controlling said gear connection, and a connection between the lower end of said crank shaft and said clutch whereby the clutch is closed when the latch is in closed position and is automatically opened when the latch is moved into open position.

6. In a gear mechanism of the class described, the combination of a suitable support provided with a hinged member, a latch for said hinged member, a driving shaft and a driven shaft rotatably mounted on said support, an adjustable driving connection between said shafts, and means for automatically compelling movement of said latch into locking position when said driving connection is adjusted into operative position.

7. In a gear mechanism of the class described, the combination of a suitable support, a vertical transmission shaft rotatably mounted at the side of said support, a horizontal gear wheel fixed to the lower end of said shaft, a vertical counter-shaft carried by said support, a driving connection between said shafts, a power shaft, a pair of pinions rotatably arranged on said power shaft to engage said gear wheel at diametrically opposite points, a clutch member slidably and non-rotatably mounted on said power shaft and adapted to be brought into driving engagement with either of said pinions to rotate said vertical shafts in one direction or the other, and means for operating said clutch member.

8. In a gear mechanism of the class described, the combination of a suitable support, a vertical transmission shaft rotatably mounted at the side of said support, a horizontal gear wheel fixed to the lower end of said shaft, a vertical counter-shaft carried by said support, a driving connection between said shafts, a power shaft, a pair of pinions rotatably arranged on said power shaft to engage said gear wheel at diametrically opposite points, a clutch member slidably and non-rotatably mounted on said power shaft and adapted to be brought into driving engagement with either of said pinions to rotate said vertical shafts in one direction or the other, a crank shaft mounted on said support, and a connecting link between said crank shaft and said clutch member for operating the latter when said crank shaft is rocked.

9. In a gear mechanism of the class described, the combination of a suitable support provided with a hinged member, a vertical transmission shaft rotatably mounted at the side of said support, an upright shaft carried by said hinged member, a driving connection between said shafts, a counter-shaft on said support, a driving connection between said transmission shaft and said counter-shaft, a horizontal gear wheel fixed to the lower end of said transmission shaft, a power shaft, a pair of pinions rotatably arranged on said power shaft to engage said gear wheel at diametrically opposite points, a clutch member slidably and non-rotatably mounted on said power shaft and adapted to be brought into driving engagement with either of said pinions to rotate said transmission shaft and counter-shaft in one direction or the other, a crank shaft mounted on said support, a connecting link between said crank shaft and said clutch member for operating the latter when the crank shaft is rocked, a latch connected with said crank shaft for automatically locking said hinged member when the crank shaft is rocked to move the clutch member into operative position.

10. In a gear mechanism of the class described, the combination of a suitable support provided with a hinged member, a vertical transmission shaft rotatably mounted at the side of said support, an upright shaft carried by said hinged member, a driving connection between said shafts, a counter-shaft on said support, a driving connection between said transmission shaft and said counter-shaft, a horizontal gear wheel fixed to the lower end of said transmission shaft, a power shaft, a pair of pinions rotatably arranged on said power shaft to engage said gear wheel at diametrically opposite points, a clutch member slidably and non-rotatably mounted on said power shaft and adapted to be brought into driving engagement with either of said pinions to rotate said transmission shaft and counter-shaft in one direction or the other, a vertical crank shaft mounted at the side of said support, a connecting link between said crank shaft and said clutch member for operating the latter when the crank shaft is rocked, and a handle at the upper end of said crank shaft, said handle constituting the latch for said hinged member for automatically locking the same when the crank shaft is rocked to move the clutch member into operative position.

11. In gear mechanism of the class described, the combination of a suitable support provided with a hinged member, an upright shaft carried by said hinged member, a latch for locking said hinged member against movement, a transmission shaft operatively connected with said upright shaft to impart an alternating rotary motion thereto as the transmission shaft is rotated, a power shaft for operating said transmission shaft, an adjustable driving connection between said power shaft and said transmission shaft, and means for simultaneously operating said latch and said driving connection, so that said latch must be moved to open position to adjust said driving connection into inoperative position.

12. In a gear mechanism of the class described, the combination of a suitable support provided with a hinged member, an upright shaft carried by said hinged member, a latch for locking said hinged member against movement, a transmission shaft operatively connected with said upright shaft to impart an alternating rotary motion thereto as the transmission shaft is rotated, a power shaft for operating said transmission shaft, an adjustable driving connection between said power shaft and said transmission shaft, and a crank shaft connected at one end with said latch and at the other end with said adjustable connection, so that when the latch is open the adjustable connection is in inoperative position, while the rocking of said crank shaft to adjust said driving connection into operative position automatically moves the latch into locking position.

13. In a gear mechanism of the class described, the combination of a suitable support provided at its upper end with a hinged member which normally rests in a horizontal position, a pair of shafts carried by said support, a driving connection between said shafts, a normally open clutch for controlling said connection, and means whereby said clutch is automatically closed when said hinged member is swung into another position.

14. In a gear mechanism of the class described, the combination of a suitable support provided at its upper end with a hinged member which normally rests in a horizontal position, a pair of shafts carried by said support, a driving connection between said shafts, a normally open clutch for controlling said connection, and means whereby said clutch is automatically closed when said hinged member is swung into another position, said means including a spring for holding the clutch in closed position.

15. In a gear mechanism of the class described, the combination of a suitable support provided at its upper end with a hinged member which normally rests on said support, a pair of shafts carried by said support, a driving connection between said shafts, a normally open clutch for controlling said connection, a rock shaft for operating said clutch, an arm secured to said rockshaft, a rod pivoted at one end to said hinged member and at the other end having a slidable connection with said arm, and a compression spring mounted on said rod to bear against said arm and thereby rock said shaft to close the clutch when said hinged member is swung into an upright position.

16. In a gear mechanism of the class described, the combination of a suitable support, a vertical transmission shaft rotatably mounted at the side of said support, a gear wheel fixed to the lower end of said shaft, a horizontal crank member fixed to the upper end of said shaft, a rack bar swiveled to said crank member for reciprocatory movement when said shaft is rotated, a central upright shaft, a pinion thereon with which said rack bar is adapted to mesh, said rack bar being readily removable from said pinion, a bracket for supporting the free end of said rack bar when moved out of engagement with said pinion, a horizontal power shaft adapted to be operatively connected to said gear wheel, and a driving pulley secured on said power shaft.

17. In a gear mechanism of the class described, the combination of a suitable support, a power shaft carried thereby, a transmission shaft perpendicular to said power shaft and a counter-shaft, a driving connection between said power shaft and said transmission shaft, a driving connection between said transmission shaft and said counter-shaft, a clutch for each of said driving connections, and means for operating said clutches independently of each other.

18. In a gear mechanism of the class described, the combination of a suitable support, a vertically extending casting secured at the side of said support, a horizontal power shaft and a vertical transmission shaft journaled in said casting, a reversible driving connection between said shafts, a clutch for controlling said connection, a counter-shaft carried by said support, a driving connection between said transmission shaft and said counter-shaft, a clutch for controlling said last-mentioned driving connection, and independent means for operating said clutches.

19. In a gear mechanism of the class described, the combination of a suitable support, a vertically extending casting secured at the side of said support, a horizontal power shaft and vertical transmission shaft journaled in said casting, a reversible driving connection between said shafts, a clutch for controlling said connection, a vertically arranged crank shaft at the side of said support for operating said clutch, a counter-shaft carried by said support, a driving connection between said transmission shaft and said counter-shaft, a clutch for controlling said last-mentioned driving connection, and means for operating said second clutch.

20. In a gear mechanism of the class described, the combination of a suitable support, a vertically extending casting secured at the side of said support, a horizontal power shaft and vertical transmission shaft journaled in said casting, a reversible driving connection between said shafts, a clutch for controlling said connection, a vertically arranged crank shaft at the side of said support for operating said clutch, a counter-shaft carried by said support, a driving connection between said transmission shaft and said counter-shaft, a clutch for controlling said last-mentioned driving connection, a hinged member at the top of said support, and means for operating said second clutch by said hinged member.

21. In a gear mechanism of the class described, the combination of a suitable support, a casting secured at the side of said support, said casting consisting in a vertical body section which terminates at its lower end in a substantially bell-shaped enlargement, a transmission shaft supported in the vertical section of the casting, a gear wheel fixed to the lower end of said shaft and housed in said enlargement, a horizontal power shaft journaled in said enlargement, a pinion rotatably mounted on said power shaft and meshing with said gear wheel, a clutch member slidably and non-rotatably mounted on said power shaft to operatively connect said pinion with said shaft, a crank member fixed to the upper end of said transmission shaft, a rack bar connected to said crank member, a central upright shaft carried by said support, a pinion fixed to said central shaft and arranged to engage said rack bar, and means for operating said clutch member.

22. In a gear mechanism of the class described, the combination of a suitable support provided with a hinged member, a casting secured at the side of said support, said casting comprising a vertical body section which terminates at its lower end in a substantially bell-shaped enlargement, a transmission shaft supported in the vertical section of the casting, a gear wheel fixed to the lower end of said shaft and housed in said enlargement, a horizontal power shaft journaled in said enlargement, a pinion rotatably mounted on said power shaft and meshing with said gear wheel, a clutch member slidably and non-rotatably mounted on said power shaft to operatively connect said pinion with said shaft, a crank member fixed to the upper end of said transmission shaft, a rack bar connected to said crank member, an upright shaft carried by said hinged member, a pinion fixed to said upright shaft and arranged to engage said rack bar, a vertical crank shaft arranged at the side of said support for operating said clutch, and a latch connected with said crank shaft for automatically unlocking said hinged member when the crank shaft is rocked to move the clutch into inoperative position, said latch being in closed position when the clutch is in its operative position.

23. In a gear mechanism of the class described, the combination of a suitable support provided with a hinged member, a casting secured at the side of said support, said casting comprising a vertical body section which terminates at its lower end in a substantially bell-shaped enlargement, a transmission shaft supported in the vertical section of said casting, a gear wheel fixed to the lower end of said shaft and housed in said enlargement, a horizontal power shaft journaled in said enlargement, a pair of pinions rotatably mounted on said power shaft and arranged to engage said gear wheel at diametrically opposite points, a clutch member slidably and non-rotatably mounted on said power shaft to operatively connect one or the other of said pinions with said transmission shaft for rotating the latter in one direction or the other, an upright shaft carried by said hinged member, a driving connection between said transmission shaft and said upright shaft, a counter-shaft having a driving connection with said transmission shaft, a clutch for controlling said driving connection, and means for controlling said second clutch by the movement of said hinged member.

24. In a gear mechanism of the class described, the combination of a suitable support provided with a hinged member, a casting secured at the side of said support, said casting comprising a vertical body section which terminates at its lower end in a substantially bell-shaped enlargement, a transmission shaft supported in the vertical section of said casting, a gear wheel fixed to the lower end of said shaft and housed in said enlargement, a horizontal power shaft journaled in said enlargement, a pair of pinions rotatably mounted on said power shaft and arranged to engage said gear wheel at diametrically opposite points, a clutch member slidably and non-rotatably mounted on said power shaft to operatively connect one or the other of said pinions with said transmission shaft for rotating the latter in one direction or the other, a vertical crank shaft arranged at the side of said support for operating said clutch, a latch connected with said crank shaft for automatically unlocking said hinged member when the crank shaft is rocked to move said clutch member into inoperative position, said latch being in closed position when the clutch is in either of its operative positions, an upright shaft carried by said hinged member, a driving connection between said transmission shaft and said upright shaft, a counter-shaft having a driving connection with said transmission shaft, a clutch for controlling said driving connection, and means for controlling said second clutch by the movement of said hinged member.

25. In a gear mechanism of the class described, the combination of a suitable support, a vertical transmission shaft arranged at the side of said support, a horizontal power shaft journaled near the lower end of said transmission shaft for driving the same, a clutch controllable connection between said transmission shaft and said power shaft, a crank disk fixed to the upper end of said transmission shaft, a horizontal member pivoted thereto, a central upright shaft carried by said support, and a driving connection between said horizontal member and said upright shaft.

In witness whereof, I hereunto subscribe my name this 30th day of March A. D. 1911.

HOWARD F. SNYDER.

Witnesses:
L. B. MAYTAG,
T. A. MOLER.